April 12, 1938. M. POTTISH 2,113,947
AUTOMATIC METER CONTROL
Filed Aug. 6, 1936 2 Sheets-Sheet 1
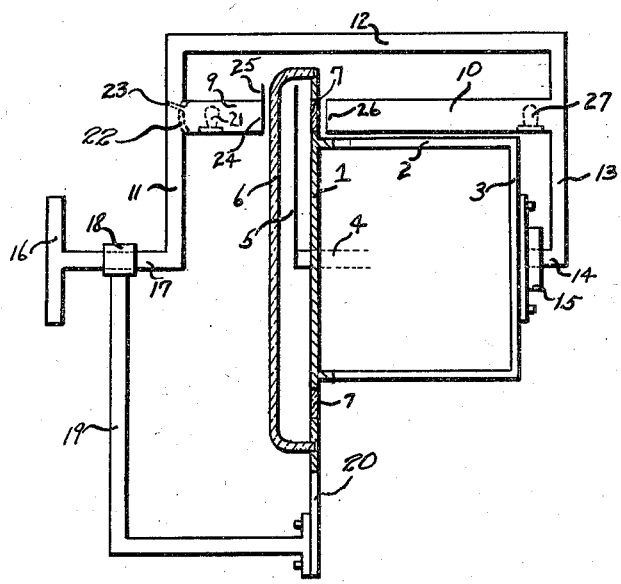
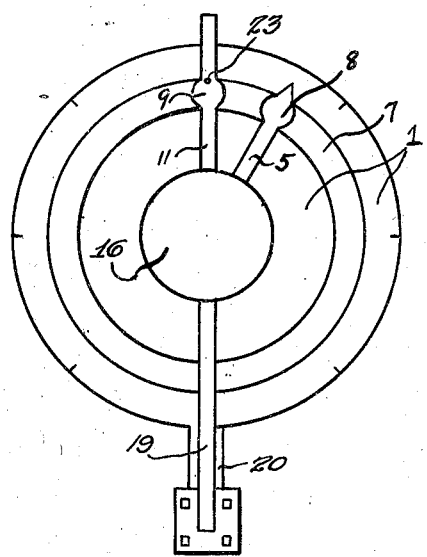
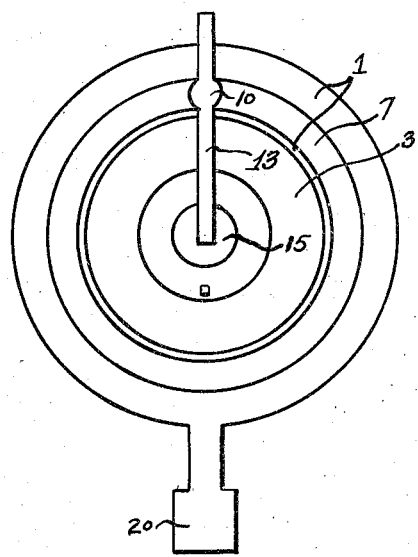
INVENTOR:
Morris Pottish April 12, 1938.  M. POTTISH  2,113,947
AUTOMATIC METER CONTROL
Filed Aug. 6, 1936   2 Sheets-Sheet 2
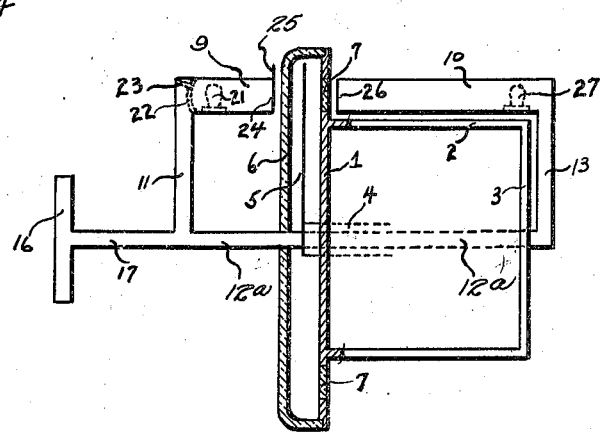
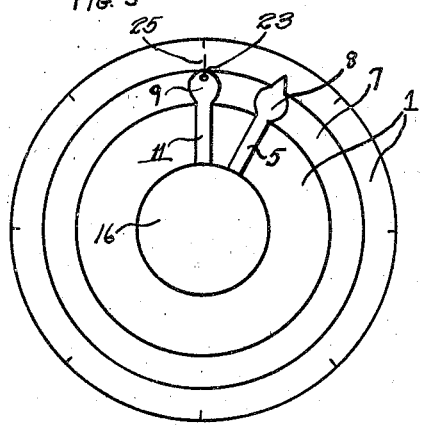
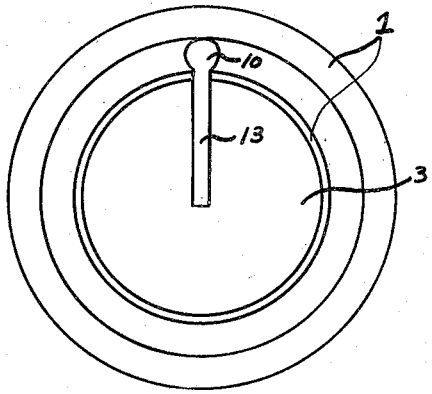
INVENTOR:
Morris Pottish Patented Apr. 12, 1938

2,113,947

UNITED STATES PATENT OFFICE 2,113,947

AUTOMATIC METER CONTROL

Morris Pottish, New York, N. Y.

Application August 6, 1936, Serial No. 94,665

1 Claim. (Cl. 250—41.5)

The invention relates to automatic meter control. The principal object of the invention is to provide a simple structure in connection with a meter so that when the meter indicator reaches any predetermined meter reading there will be automatically initiated a predetermined electrical or mechanical action.

Many uses will suggest themselves. An important use is in connection with the altimeter of an aircraft whereby the pilot, by means of the invention, could provide that when the craft reached a predetermined altitude there would be initiated the necessary action to cause the craft to rise, dip, swerve, or proceed in any other predetermined course, as, for example, a rise and swerve to the right.

Other important objects and uses of the invention will readily become apparent to the reader of the following specification and the drawings referred to therein.

In the accompanying drawings showing embodiment of the invention, similar reference characters designate corresponding parts throughout the several views.

Figure 1 represents a side plan view.

Figure 2 represents a front plan view.

Figure 3 represents a rear plan view.

Figures 4, 5 and 6 represent side, front and rear plan views, respectively, of the same invention and device under a slightly-changed arrangement of parts, the essential inventive features being identical, as will be hereinafter explained.

The walls 1, 2, 3 of the meter enclose the ordinary meter apparatus which is not shown in the drawings. The rod 4 controlling the meter indicator 5 is connected to the meter apparatus in ordinary fashion, and the connection is not shown because it may vary and is well-known. The face (which is also the front wall) 1 and the indicator 5 of the meter are covered and protected by the usual glass or transparent covering 6.

The front wall 1 of the meter contains as indicated a circular transparent window 7 so disposed as to be beyond the perimeter of the walls 1, 2, 3 enclosing the meter apparatus and further so disposed as to be directly opposite the path traversed by the circular portion 8 of the meter indicator 5 when the latter is rotated about its controlling rod 4.

Two opaque tubes 9, 10 are supported by rods 11, 12, 13 as indicated so as to be capable of rotation about a circle equal and opposite to the window 7 in the front wall 1 of the meter. The rear supporting rod 13 has a bend 14 which rests in a socket 15 firmly attached to the rear wall 3 of the meter. There is a knob 16 connected to the front supporting rod 11 by a horizontally-disposed rod 17 which runs through a supporting hollow tube 18 which in turn is supported by a brace 19 which may be attached to an extension 20 of the meter front wall 1.

The front tube 9 contains within it a source of light, as an electric light bulb 21. A reflector 22 may be inserted if greater intensity of the light beam is desired. There may be a small opening 23 to permit the operator to see if the bulb 21 is lit. The tube 9 also has a window or opening 24 to permit the passage of the light beam toward the meter. Just above this window 24 is attached an indicator pointer 25.

The rear tube 10 contains a similar window or opening 26, and contains within it also an ordinary photo-electric cell 27. The method of arranging and connecting this photo-electric cell 27 in relay and circuit so that an interruption of light activating the cell will initiate a predetermined electrical or mechanical action is well-known in the art and is therefore not shown in the drawings or explained herein.

To operate the device, the knob 16 is turned to set the indicator pointer 25 at any meter reading desired as indicated on the face 1 of the meter. This of course carries both tubes 9, 10 to positions directly opposite that reading. The current to light the electric bulb 21 is turned on, and then the current to the system of relay and circuit connected to the photo-electric cell 27 is turned on. These currents are turned on by simple switches not shown in the drawings because well-known in the art. If desired, a single switch may be used of the well-known type which will turn on first the bulb current and second the relay and circuit current.

The beam of light from the bulb 21 passes out of the tube 9 through its window 24, on through the transparent covering 6, on through the other windows 7, 26, and in through the rear tube 10 to activate the photo-electric cell 27.

This simple action sets the automatic meter control in operation. When the meter indicator 5 reaches the reading at which the indicator pointer 25 has been set, the circular portion 8 of the meter indicator 5 will pass before the front tube window 24 to cut off the light which is activating the photo-electric cell 27 and thus initiate the predetermined action in accordance with the electrical relay and circuit previously determined and installed.

Figures 4, 5 and 6 show the same device with the same mode of operation, except that the indicator control rod 4 is hollow and that the connecting rod 12 which enables simultaneous rotation of the tubes 9, 10 is arranged so that said rod 12 performs the same function by making it an extension 12a of the horizontal rod 17 so as to constitute an axle 12a passing directly through the hollow indicator control rod 4 to meet and be fixed to the rear supporting rod 13. This obviates the necessity for the connecting rod 12, the upper part of the supporting arms 11, 13, the hollow supporting tube 18, the brace 19, and the wall extension 20. It also makes the device less cumbersome and gives greater visibility of the meter face 1.

There is also a possible variation by doing away entirely with the movable tube 9 containing the source of light 21 and having instead a stationary light located in such position in front of the meter that when lit it will activate the photo-electric cell 27 in no matter what position the latter may be. However, I believe that the embodiment of the source of light 21 in the movable tube 9 is preferable.

It can be seen that the foregoing invention discloses a system for automatic control in connection with a meter, and that the same may be used to play an important role in aircraft operation, among other uses. While the foregoing specification sets forth the invention in specified terms it is to be understood that numerous changes in the shape, size and materials can be resorted to without departing from the spirit and scope of the invention as claimed herein, and it may be used for the purpose of automatic control of any other mechanical or electrical devices. I desire to have it understood that the apparatus shown is only illustrative and that the invention could be carried out by other means. Also while it is designed to use the various features and elements in the combination and relation described some of these may be used and others omitted without interfering with the general results outlined, and the invention extends to such use.

Having described my invention, what I desire and claim to secure by Letters Patent, is:

In an automatic meter control, a meter having a turnable indicator arm acting across its face, a circular transparent window mounted on said meter and extending along the path of said indicator arm and having a free perimeter edge along which said meter may be mounted on a dashboard or panel, a transparent cover for the face of said meter, a light and coacting photo-electric cell on opposite sides of said circular transparent window and transparent cover and adapted to control a circuit when said indicator arm passes there-between, radial arms on opposite sides of said meter and supporting said light and said photo-electric cell on the ends thereof, and a shaft extending through the center of said meter and supporting said radial arms and movable through 360° coaxially with said indicator arm to support said cell and said light in predetermined positions along said circular transparent window through a distance of 360°, whereby said meter may be mounted by said free perimeter edge in an opening in a dashboard or similar substantially flat surface with its face substantially flush with the face of said dashboard.

MORRIS POTTISH.